Dec. 12, 1967  J. K. KARFO  3,357,308
APPARATUS FOR PRODUCING 3-DIMENSIONAL FORM
Filed Oct. 22, 1965  3 Sheets-Sheet 1

INVENTOR
John K. Karfo
BY *Marn & Jangarathis*
ATTORNEYS

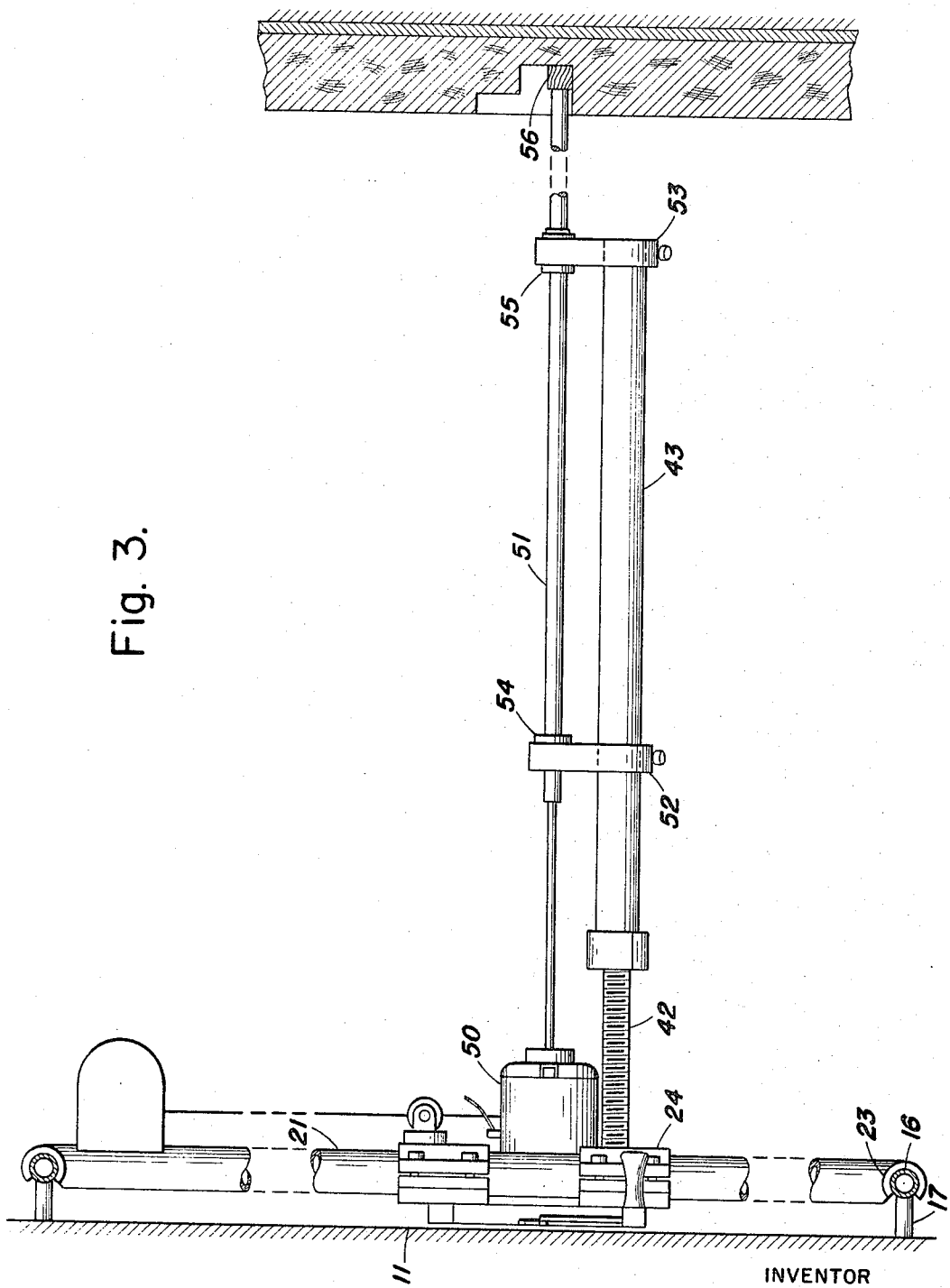

United States Patent Office 3,357,308
Patented Dec. 12, 1967

3,357,308
APPARATUS FOR PRODUCING
3-DIMENSIONAL FORM
John K. Karfo, 939 Madison Ave.,
New York, N.Y. 10021
Filed Oct. 22, 1965, Ser. No. 502,202
5 Claims. (Cl. 90—13)

ABSTRACT OF THE DISCLOSURE

Apparatus for forming a rectangular plastic block into a three-dimensional shape to represent the elevational data and curvilinear directions of the respective curvilinear contour lines on a two-dimensional topographical map, including a first motor actuating an elongated shaft variable in length and carrying a cutting tool, an elongated telescoping rod assembly comprising a hollow member for rotatably accommodating a rod therein, a second motor rotating the rod in the hollow member, and calibrated means included in the second motor for counting predetermined numbers of revolutions of the rod in the hollow member to adjust the overall length of the telescoping rod assembly to represent the elevational data of the respective contour lines on the map and thereby to vary the effective length of the shaft in corresponding amounts whereupon the first motor actuates the elongated shaft and cutting tool to route the plastic block in such depths and curvilinear directions as to represent the elevational data and curvilinear directions, respectively, of the respective contour lines on the map.

---

This invention relates to apparatus for translating two-dimensional data into a three-dimensional form and, more specifically, to such apparatus for routing curvilinear positions of material from a block of a plastic substance in correspondence with discrete tracings of the respective contour lines delineated on a topographical map whereby the plastic block is fashioned into a three-dimensional form of the two-dimensional data.

The architectural field is in great need of facile and accurate apparatus for expeditiously producing three-dimensional models of two-dimensional data. Such models are of inestimable assistance to architects in the selection of an optimum location for a building structure of given size and weight with reference to a particular terrain. In addition, such models are of equally great assistance to civil engineers, geologists, sanitary engineers, all of whom may be called upon to work with the terrain at the optimum location selected by the architect in the erection of the given building structure, or to work with that terrain or any terrain for other purposes. Also, such models may have especially pertinent value for military personnel in the evaluation of given terrain for military purposes.

The prior art discloses apparatus for providing a three-dimensional model of two-dimensional elevational data shown on a topographical map by removing material from a mass of plastic substance in amounts and directions corresponding with such data. This apparatus includes numerous precision parts assembled into a router requiring careful adjustments from time to time by a user thereof. The prior art apparatus is movable between a table carrying a reverse print of the topographical map and a structure thereabove supporting the plastic mass. Shavings falling from the plastic mass may lodge on the surface of the print, thereby tending to obfuscate the contour lines thereon and thereby necessitating brushing of the reverse print surface from time to time.

It is possible that during such brushing, the router may be inadvertently moved from a given position on the print so as to introduce intolerable error into the resulting three-dimensional model. Because the operation of the router would appear to require the user to project at least his head into the space between the reverse print and the plastic mass in order to trace the discrete contour line on the reverse print, it is also possible that the user may alternately find himself in a physically awkward and cramped position, whereby further error may be introduced into the resulting three-dimensional model. Moreover, the shavings falling from the plastic mass may get on to the user's head or even into his eyes, thereby impairing his vision for the moment whereby additional error may be introduced into the resulting three-dimensional model.

The present invention contemplates facile apparatus for expeditiously translating two-dimensional data delineated via the contour lines on a reverse print of a regular topographical map into a corresponding three-dimensional form.

The principal object of the invention is to provide apparatus for producing three-dimensional forms.

Another object is to provide a new and improved apparatus for producing three-dimensional forms from a print of an ordinary topographical map.

Still another object is to provide apparatus for producing three-dimensional forms from two-dimensional topographical maps in which reverse prints of the maps and the forms derived therefrom are mounted on opposing vertical walls.

A further object is to provide apparatus for producing three-dimensional forms in which cuttings from the forms are disposed such horizontal distance from a user of the apparatus as to preclude interferences with either a reading of a reverse print of the map or a use of the apparatus.

A still further object is to provide apparatus for producing three-dimensional forms from reverse prints of a topographical map in which unimpeded and facile access to the information on the prints is available at all times to the user.

An additional object is to translate elevational data represented by discrete contour lines shown on a topographical map into predetermined numbers and revolutions of a telescoping rod which controls the positioning of a motor-driven cutting tool.

Still another object is to program preselected numbers of revolutions of a telescoping rod coupled to the rotor of an electrical motor, the numbers of revolutions of the telescoping rod controlling the position of a cutting tool mounted on a shaft of a drive motor for positioning a rotating cutting tool at preselected depths in a three-dimensional form.

A further object is to provide a router which is expeditiously maneuverable in curvilinear directions in a vertical plane.

An additional object is to provide new and improved apparatus for providing three-dimensional forms from two-dimensional information mounted in a vertical plane.

Still another object is to position a block of plastic material in a vertical plane for fashioning into a three-dimensional form.

Another object is to movably mount routing apparatus on a vertical wall for translating two-dimensional data into three-dimensional forms.

Also, another object is to trace expeditiously the contour lines on a print of a topographical map unencumbered by either shaving falling from a block of plastic material being fashioned into a three-dimensional model or by the physical limitations of the ambient tracing area.

In association with a reverse print of an ordinary topographical map mounted on one vertical wall and a rectangular block of preselected plastic material mounted on an opposite vertical wall for fashioning into a three-dimensional form of the two-dimensional data represented by the contour lines delineated on the reverse print, a specific embodiment of the present invention comprises a router including an annular member having an opening for tracing the respective contour lines on the reverse print, a rotatable tool for cutting grooves into one surface of the plastic block, and a motor having the cutting tool detachably affixed to one end of its rotor shaft. A counter built into a second motor attached to a telescoping rod and positioned upon the router counts the revolutions of the rod whereby the depths of the respective grooves cut into the plastic block are determined by a preselected number of telescoping rod revolutions for selective positioning of the cutting tool. In this way, the elevational data delineated by the respective contour lines on the reverse print are translated into grooves of corresponding depths in the plastic block in accordance with the preselected numbers of telescoping rod revolutions for fashioning the plastic block into a three-dimensional representation of the two-dimensional data.

One feature of the present invention is that a user is provided with ample space in which he may sit or stand while engaged in the tracing of the respective contour lines on the reverse print, thereby producing highly accurate three-dimensional forms. Another feature is that cuttings from the vertically mounted plastic block are dropped at such distance from the vertically mounted reverse print as to preclude obfuscation of the contour lines, thereby producing a still more accurate three-dimensional model. A further feature is that the number of revolutions of a telescoping rod may be expeditiously preselected to provide a predetermined depth of grooves in the plastic block, thereby permitting a facile and expeditious operation of the router. Still another feature concerns the single adjustment of the revolution counter for each contour line, thereby permitting accurate and efficient use of the router. Also, a further feature relates to an unimpeded tracing of the respective contour lines on the reverse print mounted in a vertical place whereby three-dimensional forms are not only expeditiously provided but are also accurately fashioned. Still another feature involves the overall simplicity of the router for enabling facile, expeditious and accurate use thereof by unskilled personnel.

The invention will be readily understood from the following description when taken together with the accompanying drawings in which:

FIG. 3 is a side elevational view taken along line 3—3 in FIG. 1.

Figure 1:
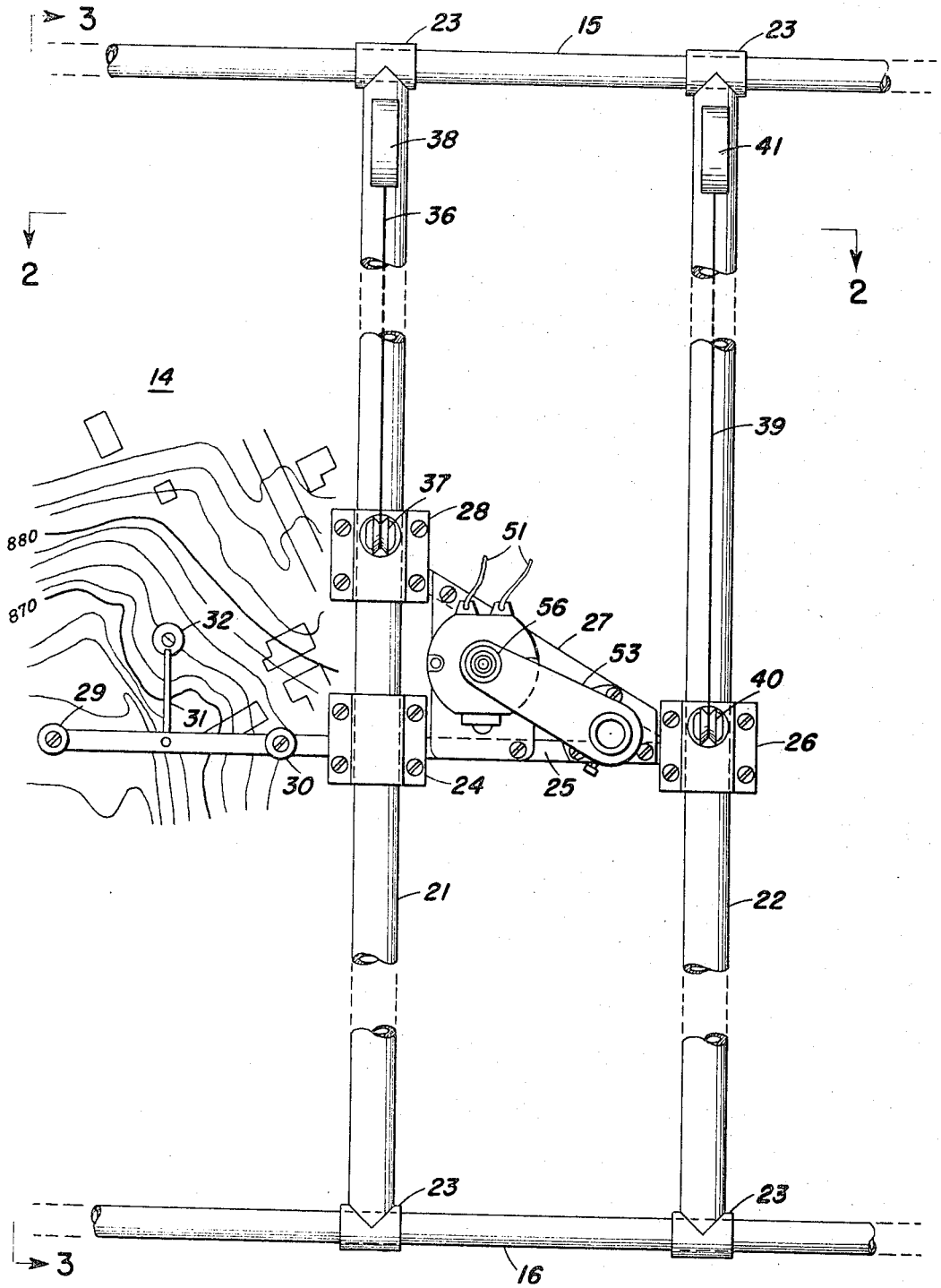
FIG. 1 is a front elevational view of a specific embodiment of the invention.
Figure 2:
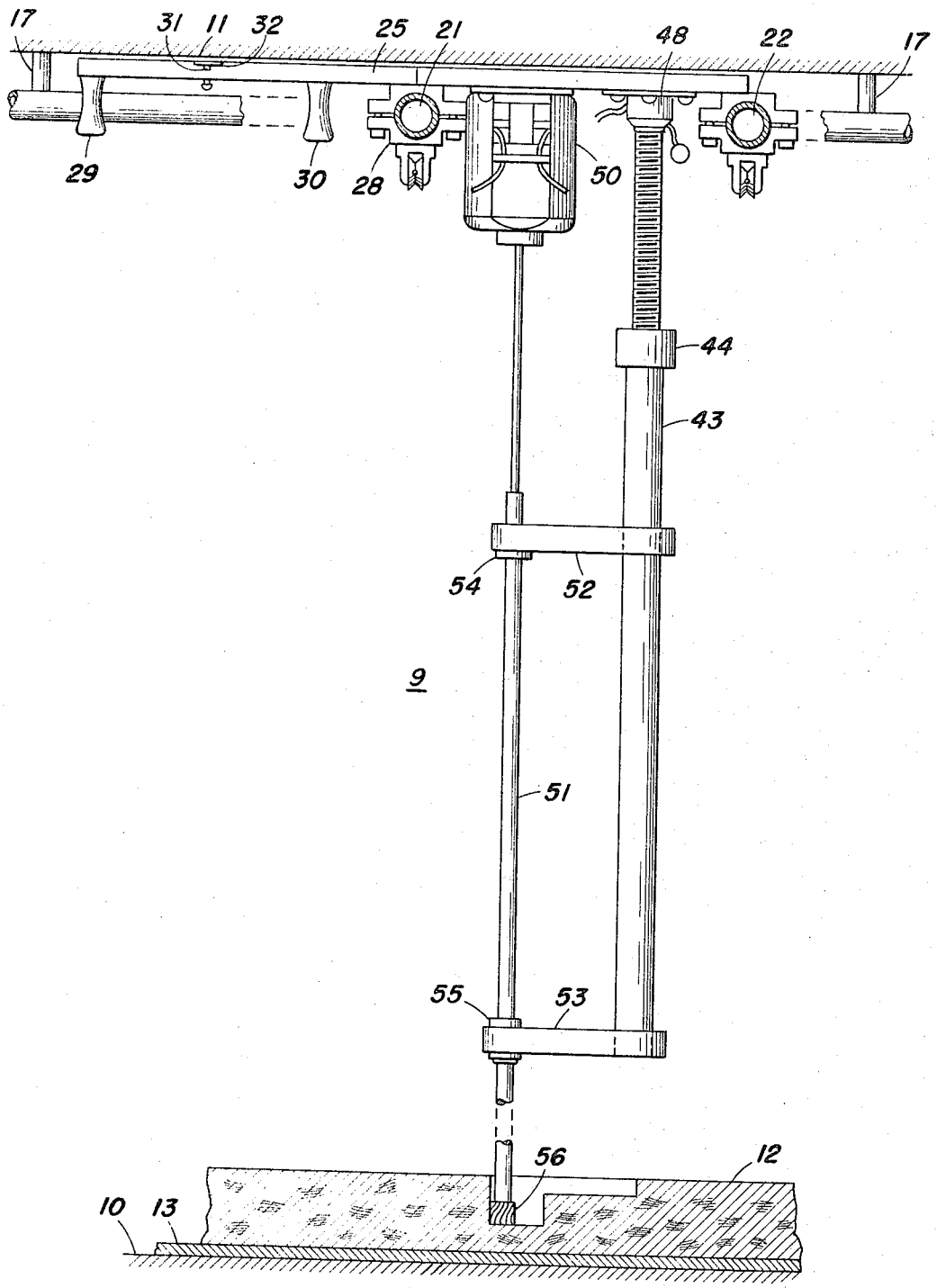
FIG. 2 is a plan view taken along line 2—2 in FIG. 1.

FIG. 2 illustrates the present invention positioned between opposite parallel and vertical walls 10 and 11 of a generally rectangular enclosure including at least these two walls and a floor, not shown. It is understood that an operator may sit on a chair or stand on the floor between the opposite vertical walls for the purpose of manipulating the present invention in a manner that is presently described. A block 12 of solid material, such, for example, as polystyrene, is glued or otherwise suitably attached to a plate 13 which is detachably mounted on vertical wall 10 at a height appropriate for a purpose that is subsequently mentioned. A reverse print 14 of a two-dimensional standard topographical map is detachably mounted on the flat surface of verticall wall 11 in FIGS. 1 and 2 at a height appropriate for a purpose that is later mentioned. Since the polystyrene block and reverse print are mutually disposed in spaced and opposing vertical planes in a mirror-like relation, it is apparent that two-dimensional information on the reverse print is translated into a true three-dimensional form on the polystryene block in accordance with the present invention as hereinafter explained. It is understood that the opposing areas of the polystyrene block and reverse print are substantially coextensive for such informational translation.

In accordance with the present invention, a power-driven router 9 comprises pipes 15 and 16 disposed in spaced parallel horizontal relation and fixedly mounted on vertical wall 11 on opposite sides of its reverse print via suitable supports 17, in FIGS. 2 and 3. Pipes 21 and 22 disposed in spaced parallel vertical relation are attached at their opposite ends to fittings 23, 23 which are slidable in opposite horizontal directions on the horizontal pipes 15 and 16 as illustrated in FIGS. 1 and 3.

A first clamp 24 mounted slidably on vertical pipe 21 in FIGS. 1 and 3 is rigidly attached substantially to a midpoint of a horizontal bar 25, shown in FIGS. 1 and 2. One end of bar 25 is rigidly attached to a second clamp 26 mounted slidably on vertical pipe 22. An angular bar 27 in FIG. 1 has one end rigidly connected to horizontal bar 25 at an end adjacent to clamp 26 and an opposite end rigidly connected to a third clamp 28 mounted slidably on vertical pipe 21 above first clamp 24. It is thus apparent that horizontal bar 25 and angular bar 27 serve to form vertical pipes 21 and 22 and sleeves 24, 26 and 28 into a unitary support for a purpose that is presently explained.

Handgrips 29 and 30 are firmly attached in spaced relation to a free lefthand end of horizontal bar 25 to extend in a direction away from and normal thereto as well as away from and normal to vertical wall 11 in FIGS. 1 and 2. A rectangular bar 31 has one end rigidly attached to the free end of horizontal bar 25 at a point substantially midway between handgrips 29 and 30 in FIGS. 1 and 2, and extends in a direction normal to the latter bar and parallel with vertical wall 11 in FIGS. 1 and 2. A flat annular member 32 rigidly mounted on the free end of bar 31 extends in a direction parallel therewith and with vertical wall 11. It is noted that the annular member lies adjacent to the reverse print attached to vertical wall 11.

A cord 36 has one end looped around and tied on a sheave 37 rotatably mounted on sleeve 28 and an opposite end wound on a spring-controlled take-up reel, not shown, and included in an automatic cord winding device 38 in FIG. 1. Similarly, a cord 39 has one end looped around and tied on a sheave 40 rotatably mounted on sleeve 26 and an opposite end wound on a spring-controlled take-up reel, not shown, and included in an automatic cord winding apparatus 41 identical in structure with cord winding apparatus 38 in FIG. 1. It is understood that the two cords are held tautly, under control of the respective cord winding apparatus, for a purpose that is later mentioned.

An elongated telescoping rod 42 provided with an external thread has one end concentrically coupled to a rotor included in motor 48 which is rigidly affixed to bars 25 and 27 adjacent to sleeve 26, and an opposite end accommodated in an internally threaded elongated hollow member 43 in FIGS. 1, 2 and 3. This rod and member project in a direction away from and normal to the reverse print mounted on vertical wall 11, and in a direction toward and normal to the plastic block.

The motor 48 may be a well-known type including a built-in counter for counting the telescoping rod 42 revolutions. It may be, for example, an atc Series 312 push-button revolution counter marketed by the B and B Motor Company, 206 Lafayette Street, New York, New York 10012. The motor control is arranged to open the power circuit to stop the motor and to return the counter to zero after completing a dial-set number of revolutions of the telescoping rod 42 in FIGS. 2 and 3. The motor 48 includes a specially designed start button integral with a front count setting knob and disposed coaxially with a circular dial calibrated to count rod revolutions.

A motor 50 has its base fixedly attached to bars 25 and 27 adjacent to vertical pipe 21, and is connected via electric leads 51a to a suitable source of 115-volt alternating or direct current power, not shown, in FIGS. 1 and 2. A rotor included in the motor projects in a direction away from and normal to the reverse print. A shaft 51 attached rigidly to one end of the rotor also projects in a direction away from and normal to the reverse print in substantially parallel relation with telescoping rod 42 and hollow member 43, as well as in a direction toward and normal to the plastic block. A cylindrical cutting tool 56 provided with a suitable cutting face is fixedly mounted on the free end of the shaft in coaxial relation therewith and for rotation therewith. Brackets 52 and 53 have corresponding ends fixedly mounted on hollow member 43. Bushings 54 and 55 included in the opposite ends of brackets 52 and 53, respectively, support rotatably the shaft therein.

In the motor operation described below, it is understood that each dial setting of motor 48 enables a count of a given number of revolutions of the telescoping rod 42. As a consequence of such predetermined number of the telescoping rod revolutions, the combined length of the rod 42 and the hollow member 43 is varied a certain amount to vary the length of shaft 51 a corresponding amount as later mentioned so as to position the cutting tool 56 at a corresponding or predetermined depth in the polystyrene block. A dial setting of motor 48 of a different number of revolutions of telescoping rod 42 enables the cutting tool 56 to assume a correspondingly different depth in the polystyrene block. It is thus apparent that each number of revolutions set on the dial of motor 48 provides a cutting tool position of correspondingly predetermined depth in the polystyrene block for a purpose that is subsequently explained.

In the operation of the present invention, it is understood that the overall length of the rotor shaft 51 in FIG. 1 is automatically adjustable via suitable linkages in the well-known manner to permit the cutting tool 56 to engage the polystyrene block 12 when the router is tracing either the maximum or minimum elevation, as well as those therebetween, as delineated by the respective contour lines shown on the reverse print. Let it be assumed for the moment that a groove corresponding with the elevation of contour line 870 on the reverse print is to be cut into the polystyrene block in FIGS. 2 and 3. For the purpose of effectuating this objective, a user grasps handles 29 and 30 and thereby moves the router 9 to the left in FIG. 1 until the opening of annular member 32 is disposed at the extreme lefthand end of the contour line.

The dial on the motor 48 is now set to count a preselected number of telescoping rod 42 revolutions in accordance with the particular elevational datum of contour line 870, and the cutting tool 56 being simultaneously positioned in engagement with the polystyrene block in accordance with such preselected revolutions. The motor 50 may already have been activated, or may then be activated to drive the cutting tool 56. Now, the user employs the opening of the annular member 32 and the pair of handles 29 and 30 to move the router 9 for tracing contour line 870 on the reverse print whereby the router 9 is moved in a generally righthand direction in FIG. 1. As a consequence, the cutting tool 56 cuts into the polystyrene block 12 a groove having a depth corresponding to the elevation of the contour line and extending in the direction thereof. At the righthand end of the contour line, the motor 50 may be stopped, thereby terminating the representation of contour line 870. It is obvious that during the tracing of this contour line the tautly held cords 36 and 39 serve to permit counter-balanced, effortless movement of the annular member 32 across the reverse print as well as to hold the latter member in a given position at any time as desired.

Now let it be assumed that a groove corresponding to the elevation of contour line 880 on the reverse print in FIG. 1 is to be cut into the polystyrene block. The dial of motor 48 is set to count a number of telescoping rod 42 revolutions in such a rotational direction as to move the cutting tool 56 in a longitudinal direction away from the block 12 a distance corresponding to 10 feet of elevation (i.e., the elevation datum difference between adjacent contour lines). In accordance with the elevational datum of this contour line 880, the user again disposes the opening of the annular member at the extreme lefthand end of the contour line. The motor 50 rotates the cutting tool 56 and, again, as the user utilizes the opening of the annular member 32 and the pair of handles 29 and 30 to move the router 9 for tracing contour line 880, the cutting tool cuts into the polystyrene block a groove having a depth corresponding to the elevation of the contour line and extending in the direction thereof. At the righthand end of the contour line, the motor 50 may be stopped, thereby terminating the representation of contour line 880. Again, it is evident that during the tracing of this contour line the tautly held cords 36 and 39 serve to permit free movement of the annular member 32 across the reverse print as well as to hold the latter member in a given position at any time as desired.

In a similar manner, the elevational data of the respective remaining contour lines on the reverse print are translated into corresponding numbers of revolutions of the telescoping rod 42, thereby the cutting tool 56 position is determined by the preselected indications of the revolution counter on the motor 48, and thereafter the cutting tool 56 cuts away material from the polystyrene block at depths in correspondence with such preselected numbers of revolutions for representing the particular elevational data. In this way, a three-dimensional form is made from the elevational data delineated by the respective contour lines shown on the reverse print of a two-dimensional topographical map.

It is obvious that a chart or a scale of indicia may be provided adjacent to the motor 48 or other suitable location for indicating the elevational data represented by preselected numbers of revolutions of the telescoping rod 42 and thereby the position of the cutting tool 56 with respect to the polystyrene block.

Because the reverse print of the topographical map and the polystyrene block are mutually disposed in a mirror-like relation, and further because the several grooves are cut directly into the polystyrene block as the opening of the annular member of the router is caused to trace the respective contour lines, it is apparent that the resulting multi-groove polystyrene block is a mirror image of the contour lines on the reverse print. Since, however, the aforementioned reverse print is the reverse or mirror image of an original two-dimensional topographical map, it is obvious that the polystyrene block is a true three-dimensional representation of the elevational data delineated on the original two-dimensional topographical map.

It is understood that the invention herein is described in specific respects for the purpose of this disclosure. It is to be further understood that such respects are merely illustrative of the application of the principles of the invention. Numerous other arrangements may be devised by those skilled in the art without departure from the spirit and scope of the invention. For example, elongated springs may be utilized in place of the cords 36 and 39 to provide constant tension for counter-balancing the weight of router 9 so as to permit effortless but controlled movement of the annular member 32 along the reverse print on wall 11.

What is claimed is:

1. Apparatus for producing three-dimensional forms to represent elevational data delineated by the respective curvilinear contour lines shown on a two-dimensional topographical map, comprising:
    a reverse print of said map positioned in a vertical plane substantially coincident with a vertical plane of a first vertical wall;
    means mounted on said first wall and simultaneously movable in horizontal and vertical directions to constitute effectively curvilinear directions apart from said last-mentioned horizontal and vertical directions over said print in a vertical plane spaced from and parallel with said print vertical plane for tracing said respective curvilinear contour lines on said print;

a second vertical wall spaced from and opposing said first wall, and adapted to receive a block of cutting material positioned in a vertical plane substantially coincident with a vertical plane of said second vertical wall;

elongated cutting tool means mounted normally on said movable means in a direction toward said block and variable in length in such direction for routing said last-mentioned block;

drive means mounted on said movable means in spaced relation with respect to said cutting tool means and having a rotor disposed normally to said movable means in parallel relation with said cutting tool means in a direction toward said block; and an elongated rod assembly mounted on said drive means rotor in coaxial relation therewith in a direction toward said block in parallel relation with said cutting tool means for rotatably supporting said cutting tool means and adjustable in length for varying the length of said cutting tool means, said rod assembly comprising an elongated hollow member fixed in position for rotatably supporting said cutting tool means and an elongated rod rotatable preset in predetermined numbers of revolutions in said hollow member for adjusting the combined length of said hollow member and rod in predetermined amounts to represent elevational data delineated by said respective contour lines on said map and to vary the length of said cutting tool means in corresponding amounts, said cutting tool means actuated in the varied lengths thereof to route said block in depths and curvilinear directions representing the elevational data and curvilinear directions, respectively, of said respective curvilinear contour lines on said print as said movable means is moved over said print to trace said last-mentioned lines thereon.

2. The apparatus according to claim 1 in which said drive means includes an electric motor having said rotor.

3. The apparatus according to claim 2 in which said elongated cutting tool means comprises:

a second motor mounted on said movable means and having a rotor disposed normally to said last-mentioned means in a direction toward said block in spaced parallel relation with said first-mentioned motor rotor, an elongated shaft mounted on said second motor rotor in coaxial relation therewith for rotatable support on said rod assembly hollow member and variable in length in a direction toward block in accordance with said predetermined combined length adjustments of said rod and hollow member, and a cutting tool mounted on an end of said shaft in proximity of said block for engagement therewith as the length of said shaft is varied by said predetermined combined length adjustments of said rod and hollow member and actuated by said shaft and second motor rotor for routing said block as said movable means is moved over said print to trace said respective contour lines on said print.

4. Apparatus for producing three-dimensional forms to represent elevational data illustrated by the respective curvilinear contour lines shown on a two-dimensional topographical map, comprising:

a reverse print of said map mounted on a first vertical wall in a vertical plane substantially coincident with a vertical plane of said last-mentioned wall;

a second vertical wall spaced from and opposing said first wall, and adapted to receive a block of cutting material mounted thereon in a vertical plane substantially coincident with a vertical plane of said second wall;

a support mounted on said first wall and movable simultaneously in horizontal and vertical directions to constitute effectively curvilinear directions apart from said last-mentioned horizontal and vertical directions over said print in a vertical plane spaced from and parallel with said print vertical plane for tracing the respective curvilinear contour lines on said print;

a motor having a first rotor disposed normally to said support, said motor immovably affixed to said support between said last-mentioned support and second wall;

an elongated shaft mounted on said first motor rotor in coaxial relation therewith to extend in a direction toward said block;

a cylindrical cutting tool attached to an end of said shaft in coaxial relation therewith in proximity of said block for rotation with said shaft and first motor rotor and engagement with said block;

a second motor having a rotor disposed normally to said support in spaced parallel relation with said first motor rotor, said second motor fixedly mounted on said support between said last-mentioned support and second wall; and an elongated rod assembly adjustable in length and coaxially coupled to said rotor of said second motor to rotatably support said shaft and vary the length thereof, said rod assembly comprising an elongated hollow member fixed in position for rotatably supporting said shaft and an elongated rod rotatable in said hollow member, and calibrated means included in said second motor for presetting said last-mentioned motor to count predetermined numbers of revolutions of said rod in said hollow member for adjusting the combined length of said last-mentioned rod and hollow member in predetermined amounts to represent elevational data delineated by said respective contour lines on said print and thereby the length of said shaft in corresponding amounts to enable said first motor to actuate said shaft and cutting tool to route said block in such depths and curvilinear directions as to represent the elevational data and curvilinear directions, respectively, of said respective curvilinear contour lines on said print as said support is moved over said print to trace said last-mentioned lines thereon.

5. Apparatus for producing three-dimensional forms to represent elevational data delineated by the respective curvilinear contour lines shown on a two-dimensional topographical map, comprising in combination:

a reverse print of said map mounted on a first vertical wall in a vertical plane substantially coincident with a vertical plane of said last-mentioned wall;

a block of cutting material mounted on a second vertical wall spaced from and opposing said first wall in a vertical plane substantially coincident with a vertical plane of said second wall;

two elongated members fixedly mounted in horizontal spaced parallel relation on said first wall to include said print therebetween;

two additional elongated members mounted in vertical spaced parallel relation on said first-mentioned two members for slidable movement in a horizontal direction thereon;

a support movably mounted on said two additional elongated members and holding said last-mentioned two additional elongated members in a fixed spaced parallel relation, said support movable in curvilinear directions adjacent to said print for tracing said respective curvilinear contour lines thereon as said two additional elongated members are simultaneously moved in a horizontal direction on said first-mentioned elongated members and said support is moved at the same time in a vertical direction on said last-mentioned two additional elongated members;

a tracing member fixedly attached to said support and movable therewith in the curvilinear direction of said support for tracing the respective curvilinear contour lines one at a time on said print;

a first motor having a rotor and fixedly mounted on said support with said rotor disposed normally thereto in a direction toward said block;

an elongated shaft adjustable in length and disposed in the direction of said block, said shaft having one end coupled to said first motor rotor and an opposite end positioned in proximity of said block, said rotor and shaft being coaxially related;

a cutting tool mounted on the opposite end of said shaft in coaxial relation therewith and having a cutting face engageable with said block;

a second motor having a rotor and fixedly mounted on said support with said last-mentioned rotor disposed normally thereto in a direction toward said block, said first and second motors mounted in spaced relation on said support to position said rotors included therein in a parallel relation;

an elongated telescoping rod assembly adjustable in length and coaxially coupled to said second motor rotor for rotatably supporting said shaft and varying the length thereof, said rod assembly comprising an elongated hollow member having an internal thread and fixed in position for rotatably supporting said shaft and an elongated rod having an external thread accommodated by said hollow member thread for rotatably receiving said rod therein; and a calibrated counter included in said second motor for presetting said last-mentioned motor to count predetermined numbers of revolutions of said rod in said hollow member for adjusting the combined length of said last-mentioned hollow member and rod in predetermined amounts to represent elevational data delineated by said respective contour lines on said print and thereby to vary the length of said shaft in corresponding amounts to enable said first motor to actuate said shaft and cutting tool to route said block in such depths and curvilinear directions as to represent the elevational data and curvilinear directions, respectively, of said respective curvilinear contour lines on said print as said tracing member and support are moved in the curvilinear directions over said print to trace said last-mentioned lines thereon.

References Cited

UNITED STATES PATENTS 3,202,895   8/1965   Arp et al. _____ 318—162

FOREIGN PATENTS 102,999   2/1938   Australia.

WILLIAM W. DYER, JR., *Primary Examiner.*

GERALD A. DOST, *Examiner.*